United States Patent [19]

Pircon

[11] 4,209,502

[45] * Jun. 24, 1980

[54] HETEROGENEOUS PROCESS

[76] Inventor: Ladislav J. Pircon, 305 Canterbury La., Oak Brook, Ill. 60521

[*] Notice: The portion of the term of this patent subsequent to May 18, 1993, has been disclaimed.

[21] Appl. No.: 677,750

[22] Filed: Apr. 16, 1976

Related U.S. Application Data

[63] Continuation-in-part of Ser. No. 467,083, May 6, 1974, Pat. No. 3,957,465.

[51] Int. Cl.² .............................. B01J 1/14; B01J 1/22
[52] U.S. Cl. ........................................ 423/659; 55/94; 55/446; 261/76
[58] Field of Search .................... 55/1, 84, 90, 91, 93, 55/94, 220, 240, 241, 242, 257, 321, 325, 331, 446, 462–465; 261/116, 111, 113, DIG. 54; 423/659

[56] References Cited

U.S. PATENT DOCUMENTS

| 243,285 | 6/1881 | McDaniel | 55/446 |
|---|---|---|---|
| 992,081 | 5/1911 | Tait | 261/76 |
| 1,527,235 | 2/1925 | Taylor | 55/1 |
| 1,964,357 | 6/1934 | Ketterer | 261/DIG. 54 |
| 2,090,994 | 8/1937 | Brandes | 55/255 |
| 2,337,983 | 12/1943 | Fisher | 55/241 |
| 2,523,126 | 9/1950 | Long | 261/113 |
| 3,406,499 | 10/1968 | Wiemer | 251/DIG. 54 |
| 3,815,332 | 6/1974 | Bobrowski et al. | 261/DIG. 54 |
| 3,820,307 | 6/1974 | Hausborg et al. | 261/DIG. 54 |
| 3,920,422 | 11/1975 | Pircon | 55/93 |
| 3,957,465 | 5/1976 | Pircon | 55/94 |

FOREIGN PATENT DOCUMENTS

| 338112 | 6/1921 | Fed. Rep. of Germany | 55/332 |
|---|---|---|---|
| 336038 | 6/1969 | U.S.S.R. | 55/220 |

OTHER PUBLICATIONS

Schutte & Koerting Co. Bulletin 4R, Cornwells Hgts., Bucks County-Pa., 7/66, pp. 1–8.

*Primary Examiner*—Frank Sever
*Attorney, Agent, or Firm*—Thomas W. Spackman

[57] ABSTRACT

An apparatus and process for promoting heterogeneous chemical and physical reactions in a gas stream using a vertical casing which is substantially liquid and gas tight having a gas inlet in the upper portion; means in the upper portion of the casing for introduction of reactant liquids and solids; a nozzle within the casing having an entry at the upper end in communication with the gas inlet and an outlet at the lower end, the entry having an effective cross-sectional area of about 2 to about 64 times the effective cross-sectional area of the outlet and the mean angle of convergence of the nozzle being about 8° to about 18°; means for removing liquid and particulate matter from the lower portion of the casing following desired reaction; and means for separately removing the gas from the lower portion of the casing. The apparatus and process of this invention is especially useful in providing a self-cleaning, non-clogging system for inducing high reaction kinetics.

6 Claims, 3 Drawing Figures

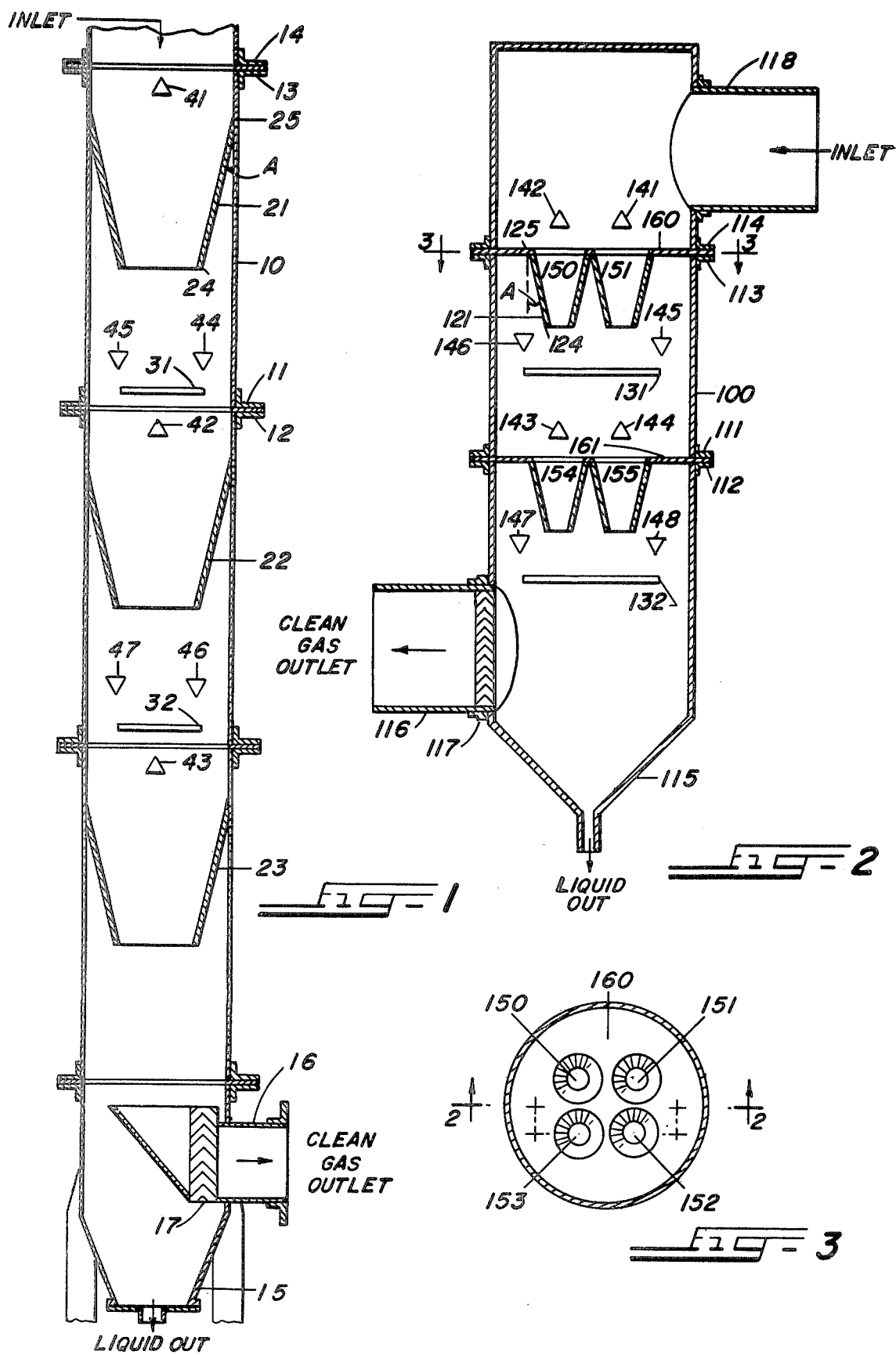

HETEROGENEOUS PROCESS

CROSS REFERENCE TO RELATED APPLICATION

This application is a continuation-in-part of co-pending application Ser. No. 467,083, filed May 6, 1974, now U.S. Pat. No. 3,957,465.

A wide number of reactors are known to the art in attempts to maximize both physical and chemical reactions between matter in different states, that is, gaseous, solid and liquid or any combination thereof. Most of the prior reactors for such purposes have been of a batch type such as kettles and agitated tank reactors. Continuous reactors have been used where surface reactions are conducted such as contactor packed column reactors or turbulent bed absorber-reactors.

The prior art heterogeneous reactors have not been as efficient as desired in that the reactions take a longer time than desired and in the case of continuous reactors, often times the slower reactions do not permit the desired completion of reaction to be achieved. Another serious disadvantage with prior continuous heterogeneous reactors has been problems of plugging when solid state materials are involved.

It is an object of the present invention to provide an apparatus and process for conducting reactions between reactants in different states which are highly efficient and useful in a wide variety of applications.

It is another object of this invention to provide an apparatus and process for the conduct of reactions involving multiple states which induces high reaction kinetics.

Still another object of this invention is to provide an apparatus which is self-cleaning and non-clogging.

Yet another object of this invention is to provide an apparatus and process for the conduct of highly efficient reactions between matter in multiple states in high temperature gas streams.

A further object of this invention is to provide an apparatus and process for the conduct of reactions between matter in multiple states under high pressure conditions.

Another object of this invention is to provide an apparatus and process for continuous reaction between matter of multiple states having a low pressure drop across the apparatus.

A further object of this invention is to provide an apparatus and process for evaporating liquids at a very high rate enabling the desired evaporation to take place in a short period of time and in a short path length.

Still another object of this invention is to provide an apparatus and process to cool gases in contact with liquid which is caused to evaporate by the absorption of heat from the hot gas.

These and other objects and feature of the invention will become more apparent from the following description and figures showing preferred embodiments wherein:

FIG. 1 shows a cross-sectional view of one embodiment of an apparatus of this invention using single nozzles in series;

FIG. 2 shows a cross-sectional view of another embodiment of an apparatus of this invention using multiple nozzle plates in series; and FIG. 3 shows a cross-sectional view of the apparatus of FIG. 2 at section 3—3.

Referring to FIG. 1, the heterogeneous reactor is shown defined by outer casing 10. The cross-sectional shape of outer casing 10 is preferably cylindrical, but may be square, rectangular, triangular, hexagonal, or other symmetrical polygon shape, but other geometrical shapes symmetrical with respect to the axis of the apparatus are satisfactory, the principal requirement being that it enclose the apparatus in generally liquid and gas type relationship while providing controlled gas flow through the interior portion. To allow maximum flexibility in the utilization and maintenance of the heterogeneous reactor, casing 10 may be fabricated in sections with the sections having flanges as shown by 11 and 13 at each end for rigid coupling to adjacent casing sections having like flanges 12 and 14. Instead of the flanges as shown in FIG. 1, any suitable coupling means may be utilized. To allow for maximum economy of original fabrication and installation of larger units the sections may be welded prior to shipment and erection. FIG. 1 shows a three stage heterogeneous reactor.

The heterogeneous reactor is arranged with its axis vertically having the reactant solid-liquid-gas inlet in the upper portion. The inlet may be in either a vertical or horizontal position. The reactant flow is supplied to the top of casing 10 through the inlet at a velocity and pressure sufficient to carry it through the apparatus. The heterogeneous reactor of this invention may be operated under any positive and negative pressures suitable for the desired reaction or evaporation or cooling objective, limited only by the materials of construction. Casing velocities can be chosen to optimize the reactions such as low velocities where high absorption efficiencies are desired to high velocities where closed loop recycle without the need for demisting is permitted.

Spray 41 may be located in the central portion of inlet to cylinder 10 and introduces liquid or solid reactant, adsorbent, absorbent or coolant in droplet form to the reactant stream, the droplets being preferably in the order of about 40 to about 1500 microns in diameter. Larger droplets may be desired to compensate for evaporation when evaporative conditions exist if it is desired to leave the cone without excessive reduction of the material. Spray 41 is preferably a solid cone spray which by itself or in combination with several like it arranged in a pattern permitting the introduction of droplets of liquid across the entire cross section of the pollutant gas stream prior to entry of the gas stream into cone 21. Different sized liquid droplets are desired to provide maximum differential accelerations, decelerations and velocities through the apparatus, thus increasing reaction rates. It is desired that the spray pattern extend across the full area of entrance 25 of nozzle 21 and any suitable pattern of sprays or multiple sprays is satisfactory. Spray 41, designed to disperse solids, may also be used to introduce solid particles of the above specified sizes to the reactant stream at the entrance 25 of nozzle 21.

The reactant containing heterogeneous solid-liquid-gas stream enters converging nozzle 21 through entry 25. It is preferred that the entry be round and the nozzle conical, but other geometrical shapes symmetrical with respect to the axis of the apparatus are satisfactory. The cone ratio, defined as the effective cross-sectional area of the entry divided by the effective cross-sectional area of the outlet, should be about 2 to about 64, about 2 to about 36 being preferred, with about 2 to about 12 being especially preferred for many low pressure drop processes. By effective cross sectional area is meant the area at 90° to the axis of gas flow.

The length of the converging portion of the nozzle is determined by the angle of convergence shown as A in FIG. 1 and the nozzle ratio as defined above. It is preferred that the mean angle of convergence be about 6° to about 20°, about 8° to about 18° being preferred and about 12° to 16° especially preferred for many low pressure drop processes. By mean angle of convergence is meant the angle measured between a straight line drawn from the entry to the outlet and a vertical line as shown by A in FIG. 1. The sides of nozzle 21 do not need to be straight, but may be somewhat convex or concave.

The distance from outlet 24 to the impingement surface 31 should be about 1.3 to about 2.5 times the diameter of outlet 24, about 1.6 to about 2.0 being preferred.

A suitable impingement plate is shown as 31 in FIG. 1. Impingement plate 31 is of sufficient size to have substantially all of the liquid-solid matter from nozzle exit 24 impinge upon it while affording sufficient area between the impingement plate and cylinder 10 to allow passage of the gas around impingement plate without appreciable pressure drop. While impingement plate 31 is shown as a flat plate, a slightly concave plate to facilitate the passage of gas around the edges and to facilitate the removal of particulate matter may be utilized. For reactions not requiring separation of solid and liquid phases from the gas phase, or mass transfer phenomena such as associated with evaporative processes such as take place in the cooling tower, an impingement surface would not be needed as shown below nozzle 23 in the apparatus of FIG. 1.

Additional sprays may be suitably located above impingement plate 31 so that the spray therefrom washes particulate matter off impingement plate 31 for progress through the apparatus and discharge at the bottom. Such sprays may be multiple sprays located around the periphery of impingement plate 31 or a satisfactory spray may be located in the central position. When sufficient fluid is used, the impingement surface will be the fluid itself and the particulate matter will not strike or adhere to the impingement plate, but will be entrapped in the fluid. The essential criteria of the sprays upon impingement plate 31 is that they provide sufficient fluid with sufficient force and direction to keep impingement plate 31 relatively free of particulate matter. The reactor may also be operated without the supplemental sprays to clean the impingement surfaces.

Because of the unitized construction of the apparatus of this invention, as shown in FIG. 1, multiple nozzle-impingement means stages may be readily placed one on top of the other, resulting in the series of three units as shown in FIG. 1. One to about 6 of the series connected stages of nozzles are suitable for many heterogeneous reactors for use in this invention. Preferably 2 to 4 stages are utilized in series. Any number of stages of nozzles may be utilized in series as is found necessary to carry the chemical or physical reaction to desired completion. The nozzle stages placed in series may provide different reaction properties by the nozzles having different inlet-outlet area ratios and different angles of convergence and may employ unitized arrangement if a great many such nozzle stages are required. The number of stages is controlled by the difficulty of reaction of the reactants, and with especially difficult materials, a greater number of stages may be necessary. This could also be influenced by the angles of convergence or effective cross-sectional area ratios of the nozzles.

Beneath the bottom stage is reservoir 15 for removal of the liquid and slurry. Exit means for the removal of the gas are also provided as shown in FIG. 1 as conduit 16. Either within the apparatus or external to the apparatus it may be preferred to have demister 17 in the clean gas effluent line to remove fine droplets of liquid remaining in the gas stream together with any solids or gases trapped by such droplets. Again, where closed loop recycling is involved it may be desired to eliminate the demisters so that the droplets in mixture with the gas and solids may continue reacting until such mixture returns to the reactor.

The vertical arrangement of the converging nozzles is particularly advantageous since using such an apparatus having a demister and a nozzle ratio of 4 and a nozzle angle of approximately 15°, the pressure drop in one nozzle is 3.5 inches of water; with two nozzles in series is 5.7 inches of water; with three nozzles in series is 7.0 inches of water; and with four nozzles in series is 8.3 inches of water when an inlet velocity of approximately 2100 feet per minute was used. Thus, it is seen that the pressure drop of the vertical series of nozzles is advantageously less than cumulative. It has been found that the pressure drop across a two stage heterogeneous reactor, both stages having an impingement plate of the type shown in FIG. 1 designed to accommodate approximately 2100 feet per minute inlet velocity is 0.9 inches of water using a nozzle ratio of 4 and a nozzle angle of approximately 12° when an inlet velocity of about 380 feet per minute was used in the removal of sulfur oxides from effluent gases from the combustion of coal.

The second stage, as shown in FIG. 1, is identical in configuration to the first stage. It is recognized, however, that the water or liquid chemical supplied to both the nozzles preceeding the cone entrance and the nozzles supplying liquid to the impingement surface of the same stage or of different stages may be individually controlled. That is, the volumes may be different and the liquid used may be different in each instance.

The passing of the liquid, solid and gaseous reactant in the stream through nozzles such as 21, promotes intimate contact between the liquid, solid and gaseous reactant and results in desired high reaction rates. It is believed the high reaction efficiency of the heterogeneous reactor and process is due to differential velocities and differential acceleration and deceleration achieved by the combination of non-compressible matter passing with the compressible gas through nozzle 21 with the opportunity for relatively great expansion following exit from nozzle exit 24. In the reactant containing stream there is a size range of compressible and non-compressible matter. Additional particles added to the gas stream by addition of solids or liquid droplets are principally non-compressible as desired to increase the non-compressible component of the gas stream. Spray 41 may be used to introduce a wide selection of liquid or solid particle sizes to the gas stream and together with a relatively wide span of liquid or solid particle sizes in the inlet gas stream, promote extremely high collision rates and high compressible gas rates flowing past the non-compressible particles and droplets resulting in very highly efficient reactions.

In order to minimize the height of the apparatus of my invention as shown in FIG. 1, I have found that multiple cones may be placed in each stage as shown in FIGS. 2 and 3. The embodiment as shown in FIGS. 2 and 3 show outer casing 100 which is substantially liquid and gas tight having gas inlet 118 in the upper portion. Casing 100 may have flanges as shown by 111 and 113 at each end for coupling to adjacent casing sections having like flanges 112 and 114.

The upper stage as shown in FIGS. 2 and 3 has plate 160 through which gas nozzles 150, 151, 152 and 153 are arranged. FIG. 3 shows the cross-sectional arrangement of the four nozzles mounted on plate 160. Any number of gas nozzles which have the properties as previously set forth, are suitable, from about 2 to about 6 being preferred in a single stage.

In a similar manner to that previously described, liquid or solid particles may be added by sprays above the gas nozzle inlets, such as spray 142 above the inlet 125 to nozzle 150.

The gas stream passes through the converging nozzles to an impingement surface beneath the nozzle exits as exemplified by exit 124 of nozzle 150. As previously described, the impingement surface may be an impingement plate shown in FIG. 2 as 131 and may have liquid sprays to aid washing particulate matter off the impingement plate as shown in FIG. 2 as 145 and 146. The impingement plate beneath multiple nozzles may be a series of separate plates having a geometry such that a gas flow passes from each nozzle for impingement upon a corresponding impingement surface following which the gas flows freely around that impingement surface for passage to the volume beneath the impingement plate assembly.

Similar to the apparatus shown in FIG. 1 beneath the lowest impingement surface is reservoir 115 for removal of liquid containing undesired particulate and/or chemical matter and means for its removal. Exit means 116 are shown in FIG. 2 for removal of the gas from below the lower impingement surface shown as 132. A demister shown as 117 is preferred when the apparatus is utilized with liquid sprays to remove fine droplets of liquid remaining in the clean gas. The second stage is shown identical to the first or upper stage.

With the unitized construction of the apparatus of this invention, multiple units may readily be placed on top of one another resulting in a series of two units as shown in FIG. 2. One to about six of the series connected stages of multiple nozzles are suitable for an apparatus of this invention, preferably 2 to 4 nozzle-impingement means stages are utilized in series. The unitized arrangement referred to earlier in FIG. 1 would also apply here. The apparatus and process of this invention is suitable for absorption, polymerization, vaporization, adsorption, stripping, gaseous cooling and condensation reactions.

The process of this invention for inducing chemical and physical reactions in gas streams comprises passing a gas stream and solid or liquid into the upper portion of a vertical casing; passing the gas stream and solid or liquid through a nozzle within the casing and having an entry in communication with the gas inlet, the entry of the nozzle having an effective cross-sectional area of about 2 to about 64 times the effective cross-sectional area of the outlet and the mean angle of convergence of the nozzle being about 8 to about 18°, the acceleration and deceleration of the gas stream causing at least two states of gas, solids and liquids to contact causing chemical and physical reaction of reactants in passing through the nozzle; removing the liquid and solid particulate matter from the lower portion of the casing; separately removing the gas from the lower portion of the casing. The liquids-solids and agglomerates thereof may be impinged upon an impingement means beneath the nozzle outlet for separation from the gas stream.

While in the foregoing specification this invention has been described in relation to certain preferred embodiments thereof, and many details have been set forth for purpose of illustration, it will be apparent to those skilled in the art that the invention is susceptible to additional embodiments and that certain of the details described herein can be varied considerably without departing from the basic principles of the invention.

I claim:

1. A process having pressure drops of less than that characteristic of a process using a venturi device, which may be operated with or without liquid for inducing heterogeneous chemical reactions in gas streams comprising:

passing a gas stream and solid or liquid reactant into the upper portion of a vertical casing;

passing the gas stream and solid or liquid at entry velocities under 2100 feet per minute through a continually converging nozzle symetrical with respect to its axis within the casing and having an entry in communication with the gas inlet, the entry of the nozzle having an effective cross-sectional area of about 2 to about 64 times the effective cross-sectional area of the oulet and the mean angle of convergence of the nozzle being about 6° to 20°, differential velocities and differential accelerations and decelerations of non-compressible liquids or solids and compressible gas substantially only along the axis of the nozzle, causing at least two states of gas, solids and liquid to contact causing chemical reaction of reactants in passing through the nozzle;

removing the liquid and particulate matter from the lower portion of the casing; and separately removing the gas from the lower portion of the casing.

2. The process of claim 1 additionally impinging solids and liquids upon an impingement means beneath the nozzle outlet.

3. The process of claim 2 wherein said impingement means is about 1.3 to about 2.5 times the diameter of said outlet.

4. The process of claim 1 wherein the pressure drop is 3.5 inches of water and less across said nozzle.

5. The process of claim 1 wherein the mean angle of convergence of said nozzle is about 8° to 18°.

6. The process of claim 1 wherein the gas inlet velocity to the entry of said nozzle is about 380 to about 2100 feet per minute.

* * * * *